(12) United States Patent
Rosen et al.

(10) Patent No.: US 8,642,177 B2
(45) Date of Patent: Feb. 4, 2014

(54) ACID ETCH RESISTANCE FOR CALCAREOUS SUBSTRATES

(75) Inventors: Brad M Rosen, Philadelphia, PA (US); Siddhartha R. Shenoy, Wilmington, DE (US); Anilkumar Raghavanpillai, Wilmington, DE (US); Ernest Bryon Wysong, Hockessin, DE (US); Joel M Pollino, Elkton, MD (US); James J Hughes, Wilmington, DE (US); John Russell Crompton, Jr., Bear, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 76 days.

(21) Appl. No.: 13/424,731

(22) Filed: Mar. 20, 2012

(65) Prior Publication Data

US 2013/0251908 A1    Sep. 26, 2013

(51) Int. Cl.
- *C08L 33/16* (2006.01)
- *C08F 220/22* (2006.01)
- *B32B 27/00* (2006.01)

(52) U.S. Cl.
USPC ............ 428/421; 524/544; 524/556; 526/242; 526/245; 526/317.1; 526/318.4; 526/318.44; 526/319; 526/328; 526/328.5; 526/329.4

(58) Field of Classification Search
USPC ................................................. 524/544, 556
See application file for complete search history.

(56) References Cited

U.S. PATENT DOCUMENTS

| | | | |
|---|---|---|---|
| 3,282,905 A | 11/1966 | Fasick et al. | |
| 3,979,469 A | 9/1976 | Jager | |
| 4,569,965 A | 2/1986 | Engel et al. | |
| 5,481,028 A | 1/1996 | Petrov et al. | |
| 6,037,429 A | 3/2000 | Linert et al. | |
| 6,303,190 B1 | 10/2001 | Linert et al. | |
| 6,465,591 B1 | 10/2002 | Lee | |
| 2007/0178239 A1 | 8/2007 | Kestell et al. | |
| 2007/0197717 A1 | 8/2007 | Ueda et al. | |
| 2010/0227173 A1* | 9/2010 | Ueda et al. | 428/421 |

FOREIGN PATENT DOCUMENTS

| | | |
|---|---|---|
| CN | 1730502 | 2/2006 |
| CN | 101469148 | 7/2009 |
| EP | 1743910 | 1/2007 |
| EP | 2206735 | 10/2008 |
| FR | 2730736 | 8/1996 |
| FR | 2922447 | 4/2009 |
| JP | 04202382 | 7/1992 |
| JP | 1994239941 | 8/1994 |
| JP | 04153274 | 5/1996 |
| JP | 09279097 | 10/1997 |
| JP | 11256070 | 9/1999 |
| WO | 9511877 | 5/1995 |
| WO | 9700230 | 1/1997 |
| WO | 0006612 | 2/2000 |
| WO | 0119883 | 3/2001 |
| WO | 0136526 | 5/2001 |
| WO | 03018508 | 3/2003 |
| WO | 2005097850 | 10/2005 |

OTHER PUBLICATIONS

Balague et al., Synthesis of fluorinated telomers. Part 1. Telomerization of vinylidene fluoride with perfluoroalkyl iodides, Journal of Fluorine Chemistry, 1995, 70, 215-223, Elesevier.

* cited by examiner

*Primary Examiner* — Vu A Nguyen

(57) ABSTRACT

A method to provide acid etch resistance to contacting a calcareous substrate with a copolymer prepared from fluorinated methacrylate, short chain branched (meth)acrylate, and (meth)acrylic acid salt and a treated substrate.

20 Claims, No Drawings

ACID ETCH RESISTANCE FOR CALCAREOUS SUBSTRATES

FIELD OF THE INVENTION

This invention relates to a method of imparting acid etch resistance to calcareous substrates.

BACKGROUND OF THE INVENTION

Hard surface substrates such as stone, masonry, concrete, unglazed tile, brick, porous clay and various other substrates are used decoratively and functionally in indoor and outdoor environments. When untreated, these materials are susceptable to staining from water, oil, and foodstuffs such as ketchup, mustard, coffee, cooking oils, wine, and beverages and acid etching from acidic liquids such as orange juice and pickle brine. Several products exist in the marketplace for treating these substrates for oil and water repellency and soil resistance. Stone and tile treatment products useful for oil and water repellency are commonly a copolymer of a fluorinated monomer providing stain release and oil repellency, with a non-fluorinated monomer, for water repellency.

Ueda et al., in U.S. Patent Application 2007-0197717, describes a masonry treating agent comprising fluoromonomer having at least one acid group, and a non-fluorinated monomer. Ueda et al., teach copolymers containing long chain linear hydrocarbon (meth)acrylates and/or monomers containing a silicone containing groups to provide water, oil and soil resistance to masonry.

What is needed are coating copolymers that provide superior performance for acid etch resistance in addition to stain resistance, oil and water repellency to hard substrates. The present invention meets these needs.

SUMMARY OF THE INVENTION

The present invention comprises a method of providing acid etch resistance, oil and water repellency to a substrate comprising contacting said substrate with a copolymer of formula (I)

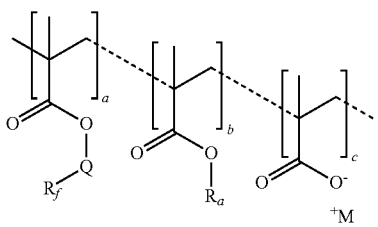

wherein
$R_f$ is $C_1$ to $C_{10}$ linear or branched fluoroalkyl, optionally interrupted by one or more —O—, —CH$_2$—, —CFH—, or combinations thereof;
Q is an alkylene of 1 to about 15 carbon atoms, hydroxyalkylene of 3 to about 15 carbon atoms, —(C$_n$H$_{2n}$)(OC$_q$H$_{2q}$)$_m$—, —(C$_n$H$_{2n}$)(NR')$_z$—SO$_2$—NR'(C$_n$H$_{2n}$)—, or —CONR'(C$_n$H$_{2n}$)—, wherein each R' is independently H or an alkyl of from 1 to about 4 carbon atoms, each n is independently 1 to about 15, q is 2 to about 4, m is 1 to about 15, and z is 0 or 1;
$R_a$ is a $C_3$ to $C_4$ branched alkyl;
M$^+$ is H$^+$, NH$_4^+$, Na$^+$, Li$^+$, Cs$^+$, K$^+$, HNR$_3^+$ or mixtures thereof;
R is $C_1$ to $C_4$ linear or branched alkyl;
a is an integer from about 20 to about 50 mol %;
b is an integer from about 5 to about 35 mol %; and
c is an integer from about 15 to about 60 mol %;
wherein the sum of a+b+c is equal to 100%.

The present invention further comprises a substrate treated in accordance as the above mentioned method.

DETAILED DESCRIPTION

Herein, trademarks are shown in upper case.

The present invention relates to a method of providing acid etch resistance, water repellency, oil repellency and stain resistance to a substrate surface comprising contacting the substrate surface with a copolymer of formula (I)

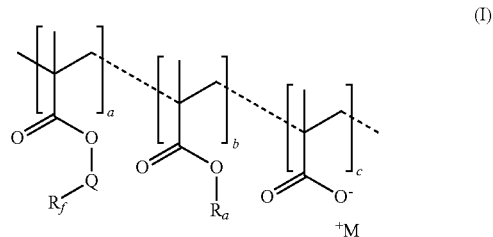

wherein
$R_f$ is $C_1$ to $C_{10}$ linear or branched fluoroalkyl, optionally interrupted by one or more —O—, —CH$_2$—, —CFH—, or combinations thereof;
Q is an alkylene of 1 to about 15 carbon atoms, hydroxyalkylene of 3 to about 15 carbon atoms, —(C$_n$H$_{2n}$)(OC$_q$H$_{2q}$)$_m$—, —(C$_n$H$_{2n}$)(NR')$_z$—SO$_2$—NR'(C$_n$H$_{2n}$)—, or —CONR'(C$_n$H$_{2n}$)—, wherein each R' is independently H or an alkyl of from 1 to about 4 carbon atoms, each n is independently 1 to about 15, q is 2 to about 4, m is 1 to about 15, and z is 0 or 1;
$R_a$ is a $C_3$ to $C_4$ branched alkyl;
M$^+$ is H$^+$, NH$_4^+$, Na$^+$, Li$^+$, Cs$^+$, K$^+$, HNR$_3^+$ or mixtures thereof;
R is $C_1$ to $C_4$ linear or branched alkyl;
a is an integer from about 20 to about 50 mol %;
b is an integer from about 5 to about 35 mol %; and
c is an integer from about 15 to about 60 mol %;
wherein the sum of a+b+c is equal to 100%.

For the first embodiment, $R_f$ is preferably $C_4$ to $C_8$ perfluoroalkyl, more preferably $R_f$ is $C_6$ perfluoroalkyl. Preferably n is 2 to 6, more preferably n is 2. In one embodiment a is an integer from about 20 to about 50 mol %; b is an integer from about 5 to about 35 mol %; and c is an integer from about 15 to about 60 mol %. Alternately, a is an integer from about 30 to about 45 mol %; b is an integer from about 5 to about 30 mol %; and c is an integer from about 25 to about 55 mol %. Alternately, a is an integer from about 35 to about 45 mol %; b is an integer from about 7.5 to about 25 mol %; and c is an integer from about 30 to about 50 mol %. Preferably, $R_a$ is a isopropyl or tert-butyl. Preferably, M$^+$ is NH$_4^+$.

A second embodiment of the present invention relates to a substrate treated with copolymers of formula (I), as defined above.

In all embodiments of the present invention, a, b, and c represent the molar percentage of each individual component that is used to prepare the copolymers of the present invention. The molar percentage of each reactant (a, b, and c) are chosen such that they are within the previously specified molar range and the sum of the combined components is equal to 100%. One skilled in the art can easily choose molar percentages for each monomer within the stated ranges so that the total equals 100%.

Copolymers useful in the present invention are prepared by radical polymerization by contacting fluorinated methacrylate monomers, branched alkyl methacrylate monomers, and methacrylate acid monomers or salts thereof together in the presence of a radical initiator.

Copolymers of Formula I are prepared via polymerization and are carried out in the presence of one or more radical initiators. The polymerization can be conducted in either batch or semi-batch mode. The radical initiators are present at 0.1 to 2.0 weight percent relative to the weight of the monomers employed. Initiators which may be used are peroxides such as, for example, benzoyl peroxide, lauroyl peroxide, succinyl peroxide and tert-butyl perpivalate, or azo compounds such as 2,2'-azobisisobutyronitrile, 4,4'-azobis(4-cyanopentanoic acid) and azodicarbonamide. Such azo initiators are commercially available from E. I. du Pont de Nemours and Company, Wilmington, Del., under the name of "VAZO" 67, 52 and 64, and by Wako Pure Industries, Ltd., Osaka, Japan, under the name "V-501". The process may also be performed in the presence of UV radiation and photoinitiators such as benzophenone, 2-methylanthraquinone or 2-chlorothioxanthone.

The reaction temperature varies within a wide range, that is to say between room temperature and the boiling point of the reaction mixture. The process is preferably performed between about 50° and about 90° C., more preferably at 60 to 80° C.

For copolymers of the present invention wherein $M^+$ is $H^+$, $NH_4^+$, $Na^+$, $Li^+$, $Cs^+$, $K^+$, $HNR_3^+$, or mixtures thereof; R is $C_1$ to $C_4$ linear or branched alkyl, the salt is formed by adding the respective base to the polymerized polymer. For example, to form copolymers of Formula I wherein $M^+$ is $NH_4^+$, one mole equivalent of ammonia is added to the reaction relative to the moles of methacrylate acid monomer used. For copolymers wherein $M^+$ is $K^+$, one mole equivalent or more of potassium hydroxide is added. Examples of suitable bases include, but are not limited to, ammonia, ammonium hydroxide, sodium hydroxide, lithium hydroxide, cesium hydroxide potassium hydroxide, or mixtures thereof.

The fluorinated methacrylate monomers used to prepare copolymers of Formula I are of formula (II)

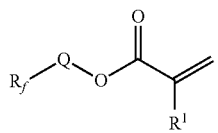

(II)

wherein $R_f$ is $C_1$ to $C_{10}$ linear or branched fluoroalkyl, optionally interrupted by one or more —O—, —CH$_2$—, —CFH—, or combinations thereof; Q is an alkylene of 1 to about 15 carbon atoms, hydroxyalkylene of 3 to about 15 carbon atoms, —(C$_n$H$_{2n}$)(OC$_q$H$_{2q}$)$_m$—, —(C$_n$H$_{2n}$)(NR')$_z$SO$_2$—NR'(C$_n$H$_{2n}$)—, or —CONR'(C$_n$H$_{2n}$)—, wherein each R' is independently H or an alkyl of from 1 to about 4 carbon atoms, each n is independently 1 to about 15, q is 2 to about 4, m is 1 to about 15, and z is 0 or 1; and $R^1$ is H or CH$_3$. Examples of $R_f$ include, but are not limited to, CF$_3$(CF$_2$)$_x$—, —CF$_3$(CF$_2$)$_x$(CH$_2$CF$_2$)$_y$—, CF$_3$(CF$_2$)$_y$O(CF$_2$)$_y$—, and —CF$_3$(CF$_2$)$_y$OCFH(CF$_2$)$_z$—, wherein each x is independently 1 to 9, each y is independently 1 to 3, and each z is independently 1 to 4. Examples of Q include, but not limited to, —CH$_2$CH$_2$—, —(CH$_2$CH$_2$)$_2$, or (CH$_2$CH$_2$)$_3$, and —(C$_2$H$_4$)SO$_2$—N(CH$_3$)(C$_2$H$_4$)—. Preferably, $R_f$ is $C_4$ to $C_8$ fluoroalkyl, more preferably, $R_f$ is $C_6$ fluoroalkyl. Preferably, Q is an alkylene of 2 to 6 carbons, more preferably Q is an alkylene of 2 carbons.

Fluorinated (meth)acrylates of Formula (II), are synthesized from the corresponding alcohols. These fluorinated methacrylate compounds are prepared by either esterification of the corresponding alcohol with acrylic acid or methacrylic acid or by transesterification with methyl acrylate or methyl methacrylate. These preparations are well known and are described in U.S. Pat. No. 3,282,905, herein incorporated by reference.

Fluorinated (meth)acrylates useful in the present invention are prepared from alcohols having the formula CF$_3$(CF$_2$)$_x$(CH$_2$)$_n$OH wherein each x is individually 1 to 9 and n is an integer from 1 to 10, are commercially available from E. I. du Pont de Nemours and Company, Wilmington, Del. These alcohols are also be prepared by reaction of the corresponding perfluoroalkyl iodies with oleum and hydrolyzed according to the procedure described in WO 95/11877, herein incorporated by reference. These alcohols are available as a homologue distribution mixture or are fraction distilled into individual chain lengths.

Fluorinated (meth)acrylates useful in the present invention are prepared from alcohols having the formula CF$_3$(CF$_2$)$_x$(CH$_2$CF$_2$)$_p$(CH$_2$)$_n$OH wherein each x is independently 1 to 4, each p is independently 1 to 2, and n is an integer from 1 to 10. These alcohols are prepared by the telomerization of perfluoroalkyl iodides with vinylidene fluoride followed by ethylene insertion. A detailed description of the vinylidene fluoride reaction is described in Balague, et al., "Synthesis of Fluorinated telomers, Part 1, Telomerization of vinylidene fluoride with perfluoroalkyl iodides", J. Fluor. Chem. (1995), 70(2), 215-23. Reaction details for the ethylene insertion reaction is described in U.S. Pat. No. 3,979,469. The alcohol are prepared with oleum and hydrolysis as described above.

Fluorinated (meth)acrylates useful in the present invention are prepared from alcohols having the formula CF$_3$(CF$_2$)$_y$O(CF$_2$)$_y$(CH$_2$)$_n$OH wherein each y is independently 1 to 3 and n is an integer of 1 to 10. These alcohols are prepared from the corresponding perfluoroalkyl ether iodides, of formula CF$_3$(CF$_2$)$_y$O(CF$_2$)$_y$I wherein each y is independently 1 to 3. These iodides are prepared according to the procedure described in U.S. Pat. No. 5,481,028, hereby incorporated by reference, by reacting a perfluorovinyl ether with ICl/HF and BF$_3$. Ethylene insertion and alcohol conversion is as described above.

Fluorinated sulfonamide(meth)acrylates useful in the present invention are prepared the fluoroalkyl alcohol of formula $R_f$—(C$_n$H$_{2n}$)SO$_2$—N(CH$_3$)(C$_n$H$_{2n}$)—OH, wherein n and $R_f$ are as defined above, and is commercially available from E. I. du Pont de Nemours and Company, Wilmington, Del. Alternately, the alcohols can be prepared by the reaction of the corresponding fluoroalkyl ethylene iodide with potassium thiocyanate in water. The product, $R_f$—(C$_n$H$_{2n}$)SCN, is distilled as a colorless liquid, which then is converted to fluorinated sulfonyl chloride having the formula $R_f$—(C$_n$H$_{2n}$)SO$_2$Cl by a reaction with chlorine and acetic acid over several hours at about 45~50° C. in an autoclave. The resulting sulfonyl chloride is then reacted with an amine, for example, such as N-methylethanolamine, to produce the fluorinated alcohols of the formula $R_f$—(C$_n$H$_{2n}$)SO$_2$—NR'(C$_n$H$_{2n}$)—OH.

Fluorinated sulfamide(meth)acrylates useful in the present invention are prepared the fluoroalkyl alcohol of formula $R_f$—(C$_n$H$_{2n}$)NR'SO$_2$—N(CH$_3$)(C$_n$H$_{2n}$)—OH, wherein n and $R_f$ are as defined above, and are prepared by the reaction of a fluoroalkyl ethylene amine with sulfuryl chloride. The resulting fluorinated sulfonyl chloride having formula $R_f—(C_nH_{2n})NR'SO_2Cl$ is then reacted with an amine, for example, such as N-methylethanolamine, to produce the fluorinated alcohols of the formula $R_f—(C_nH_{2n})NR'SO_2—NR'(C_nH_{2n})—OH$.

The copolymers of Formula I are preferably in the form of a dispersion. It is typically employed as an aqueous dispersion. Copolymers of Formula I wherein a is any integer from about 20 to about 50 mol %, b is any integer from about 5 to about 35 mol %, and c is any integer from about 15 to about 60 mol %, provided that a+b+c equals 100%. The dispersions are preferably prepared in an aqueous dispersion optionally with one or more surfactants and/or additional components such as sealers.

Surfactants useful in the present invention, such as in the first and second embodiments, are any of those surfactants commonly used to prepare aqueous dispersions. Examples of suitable surfactants are methyl chloride salt of an ethoxylated alkyl amine salt, such as an 18-carbon alkylamine with 15 moles of ethylene oxide and condensation products of ethylene oxide with $C_{12}$ to $C_{18}$ fatty alcohols; $C_{12}$ to $C_{18}$ fatty acids; alkyl phenols having 8 to 18 carbon atoms in the alkyl group; $C_{12}$ to $C_{18}$ alkyl thiols and $C_{12}$ to $C_{18}$ alkyl amines. Preferred examples of suitable surfactants are commercially available as ETHOQUAD 18/25 available from Akzo Nobel, Chicago, Ill. and as TWEEN 20, available from Sigma Aldrich, St. Louis, Mo.

The present invention can further comprise other components that enhance the appearance of the substrate and/or performance of the copoylmers of the present invention. Examples of such components include, but not limited to, semi-gloss and/or high gloss sealers. These components, such as sealers, can apply additional stain resistance, protection from ultraviolet light and/or permits moisture vapor transmission. Suitable sealers and finishes are available from E. I. du Pont de Nemours and Company; Aqua Mix, Inc.; Glaze 'N Seal; and Homax Jasco Bix, Bellingham, Wash. Most common sealers comprise acrylate based compounds. It was found that by adding sealers to the copolymers of the present invention, the treated substrates had improved acid etch resistance, even when compared to the copolymers alone, while maintaining some, if not all of the oil and water repellency properties.

The present invention comprises a method of providing acid etch resistance, water repellency, oil repellency and stain resistance to a substrate surface comprising contacting the substrate surface with a copolymer of formula (I). The copolymers of the present invention are in the form of an aqueous dispersion and can optionally contain one or more surfactants and/or additional components such as sealers. The dispersions are added alone or can optionally include additives or treatment agents. The copolymers of the present invention are applied to substrates by known means, including but not limited to, brushing, spraying, rollering, dipping, padding, doctor blade, wipe, dip techniques, and wet-on-wet procedure. For example, for a hard surface such as tile, application of copolymers of the present invention are applied by brushing or spraying. The copolymers of the present invention can be cured on substrates at temperatures from room temperature (about 20° C.) to about 150° C. for a time period of 2 minutes to 14 days. One skilled in the art would appreciate that when lower temperatures are used, a longer cure time is needed, and when higher temperatures, a shorter cure time is can be utilized. It was surprisingly found, that by curing at 150° C. for 2 minutes, the copolymers of the present invention produce a treated substrate with superior acid etch resistance.

The present invention further comprises one or more substrates treated according to the method of the present invention. These substrates are calcareous hard surfaces and can include other substrates known to be prone to acid etching. Examples of hard surface substrates include, but are not limited to, white marble, black marble, limestone, or travertine. These substrates generally contain calcium carbonate and are known to be prone to etching when exposed to acidic liquids such as those found in residual and commercial kitchens as well as mineral acids. These liquids include orange juice, pickle brine, vinegar, $H_2SO_4$ and HCl. Untreated substrates show etching on the surface by these liquids and appears as a crater that has noticeable difference in appearance compared to un-etched areas of the same substrate. The treated substrates of the present invention have improved acid etch resistance when exposed to household acidic liquids such as pickle juice, orange juice, and vinegar as well as mineral acids such as $H_2SO_4$ and HCl.

The methods and treated substrates of the present invention are useful in providing acid etch resistance to liquid such as orange juice, pickle brine and vinegar as well as provide stain resistance and water and oil repellency to a variety of substrates. The copolymers are easily adaptable for a variety of applications and are used as organic or aqueous dispersions and optionally contain one or more surfactants.

EXAMPLES

Materials and Test Methods

Application and Testing of Polymers on Stone Tile surface

Polished marble tiles have a hydrocarbon-based wax coating on the surface. This coating must first be removed prior to conducting this test to ensure accurate measurement of acid-etch hold-out. Each marble tile was washed with soap and water, dried, and then wiped with acetone.

Limestone tiles were washed with water using a damp SONTARA wipe (commercially available from E. I. du Pont de Nemours and Company, Wilmington, Del.) and allowed to air-dry overnight. The stones were dried overnight at room temp and sectioned into 9 equal segments by adhesive tape. Two wt % solutions of the copolymer of the present invention were applied as dispersions to each section using a foam brush, unless otherwise stated. The amount of polymer applied was determined by taking the weight difference of the polymer stock solution before and after application. Each section was brushed with a dispersion to form one even coat. Typically four main brush passes were used to cover the surface. After 45 minutes of drying, a second coat was applied in the same manner as the first. The coating was allowed to dry overnight and then performance evaluated by the test methods described below.

Test Method 1: 60 Minute Acid-Etch Hold-Out Test

Calcium Carbonate ($CaCO_3$) surfaces such as limestone, marble, and travertine are susceptible to surface etching by the acids present in conventional household staining materials. The etch left on the surface by these stains is manifested as a crater that has differential optical properties to neighboring un-etched areas of the substrate. Due to the dependence of this optical effect on the reflectance of light off a surface, this difference in appearance is more pronounced on polished surfaces relative to honed surfaces.

The capability of a coating system to protect against acid-etch was measured on black marble, limestone, or travertine substrates. The acidic stains we employ are: vinegar (pH=2.68), orange juice (pH=3.98), and pickle brine (pH=4.25), and mineral acids such as $H_2SO_4$ (1M, pH=0.75) and HCl (1M, pH=0.56).

Application of the acid: The dwell-times measured are noted in the tables (i.e., 5 minutes, 10 minutes, 20 minutes, 45 minutes, 60 minutes, 2 hours, 4 hours, 6 hours, 8 hours, or 24 hours). The acids are applied using a disposable pipette according to the following procedure:
1. Place a drop of each acid horizontally across the tile, leaving sufficient space between them to avoid touching/mixing.
2. Set a count-down timer for 60 minutes and push start.
3. Apply a second drop of each acid directly below the previous stain when timer gets to 45 minutes.
4. Apply a third drop of each acid directly below the previous stain (in a vertical row) when timer gets to 20 minutes.
5. Apply a fourth drop of each acid directly below the previous stain (in a vertical row) when timer gets to 10 minutes.
6. Apply the fifth drop of each acid directly below the previous stain (in a vertical row) when timer gets to 5 minutes.
7. When the timer gets to 0 minutes, wash the tile in warm water and use a SONTARA wipe (or nylon scouring pad) to remove any residue present on the testing surface
8. Allow the tile to air dry for at least 3 hours.

Measurement of Acid-Etch: Acid-etch rated by qualitative visual inspection using a scale of 0 to 3, using the following guidelines (Table 1):

TABLE 1

Etch Rating

| Etch Score | Description of Etch |
| --- | --- |
| 0—No etch is observable | No difference in gloss between areas exposed to the acidic stain and those left unexposed. |
| 1—Minor etch | Areas exposed to acidic stain are noticeably different from those left unexposed. |
| 2—Moderate etch | Optical difference is apparent and the etch is also noticeable to touch |
| 3—Severe etch | The etched area is visually apparent inspection and noticeable to touch. The exposed substrate is damaged. |

Test Method 2. 24-Hour Etch Testing

One drop each of common household etches (mustard, ketchup, vinegar, orange juice, red wine and coke) were individually placed on the treated tile surface and allowed to sit for 24 hours. The etches were removed by washing with water and a nylon bristle brush. The treated stone was allowed to dry at room temperature (72 to 78° F.) until the stone was completely dry (approximately 12 to 24 hours). The stain residue remaining on the tile surface was visually rated from 0 to 3 (Table 1). Lower rating indicates better performance.

Test Method 3. Water Repellency Test

The water repellency of treated stone tile substrates and fibrous substrates was measured according to AATCC (American Association of Textile Chemists and Colorists) standard Test Method No. 193-2004. The test determined the resistance of the treated substrate to wetting by aqueous test solutions (see Table 3 for Test Solution copolymers). Drops of test solutions (approximately 5 mm in diameter or 0.05 mL volume) of water-alcohol mixtures of varying surface tensions were placed on the treated substrate and the extent of surface wetting was determined visually. Three drops of test solution #1 were placed on the substrate. After 10 seconds, the drops were removed by using vacuum aspiration. If no liquid penetration or partial absorption (appearance of a darker wet patch on the substrate) was observed, the test was repeated with Test Liquid 2 and with progressively higher Test Liquid numbers until liquid penetration (appearance of a darker wet patch on the substrate) was observed. The rating was the highest Test Liquid number that did not penetrate into the substrate. Higher scores indicate greater water repellency and superior performance.

The composition of water repellency test liquids is shown in the Table 2 below.

TABLE 2

| Test Solution # | Composition, Volume % | | Rating Number |
| --- | --- | --- | --- |
| | Isopropyl Alcohol | Distilled Water | |
| 1 | 2 | 98 | 1 |
| 2 | 5 | 95 | 2 |
| 3 | 10 | 90 | 3 |
| 4 | 20 | 80 | 4 |
| 5 | 30 | 70 | 5 |
| 6 | 40 | 60 | 6 |
| 7 | 50 | 50 | 7 |
| 8 | 60 | 40 | 8 |
| 9 | 70 | 30 | 9 |
| 10 | 80 | 20 | 10 |
| 11 | 90 | 10 | 11 |
| 12 | 100 | 0 | 12 |

Test Method 4. Oil Repellency Test

The oil repellency of treated stone tile substrates and fibrous substrates was tested using a modification of AATCC standard Test Method No. 118, and was modified as follows. A series of organic liquids, identified below in the Table 11, were applied drop wise to the substrate. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids results in two of the three drops failed to remain spherical to hemispherical, or wetting or wicking occurs.

The oil repellency rating was the highest numbered test liquid for which two of the three drops remained spherical to hemispherical, with no wicking for 30 seconds. Higher scores indicate greater oil repellency. Table 3.

TABLE 3

| Rating Number | Test Solution |
| --- | --- |
| 0 | Fails NUJOL* Purified Mineral Oil |
| 1 | NUJOL* Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |
| 7 | n-octane |
| 8 | n-heptane |

*NUJOL (comercially available from Plough, Inc., Memphis, Tennesee) is a mineral oil having a Saybolt viscosity of 360/390 at 38° C. and a specific gravity of 0.880/0.900 at 15° C.

EXAMPLES

Example 1

Perfluoroalkyl methacrylate, having the formula $CF_3(CF_2)_5CH_2CH_2OC(O)C(CH_3)=CH_2$ (20 g, 46.2 mmol, available from E. I. du Pont de Nemours and Company, Wilmington, Del.), methacrylic acid (4.0 g, 46.4 mmol), isopropyl methacrylate (1.2 g, 9.36 mmol, commercially available from Sigma-Aldrich, St. Louis, Mo.), mesitylene (70 mg, 0.58 mmol) and tetrahydrofuran (34 g) were added to a nitrogen purged reaction vessel equipped with a magnetic stir bar and condenser. The reaction vessel was then sparged with nitrogen at room temperature (approximately 23° C.) for one hour. The reaction was then heated to 60° C. Initiator (0.48 g, in 2 g THF, VAZO 67) was added to the reaction flask using a syringe. The temperature of the reaction mixture was held at 68° C. for 22 hours. The reaction mixture was then cooled to room temperature (23° C.) and was analyzed to be a fluorinated methacrylate/methacrylic acid/i-propyl methacrylate copolymer.

The fluorinated methacrylate/methacrylic acid/t-butyl methacrylate copolymer was heated to 45° C. and ammonium hydroxide (14.6 M, 1.42 g in 50 g water) was added. The reaction mixture was stirred under a nitrogen blanket for 1.5 h at 45° C. The mixture was concentrated in vacuo to remove residual THF and resulted in a 19.7 weight % solids dispersion in water. It was further diluted with water to 2 wt % solids tested according to the methods described above.

Example 2

Perfluoroalkyl methacrylate, having the formula $CF_3(CF_2)_5CH_2CH_2OC(O)C(CH_3)=CH_2$ (14.6 g, 33.8 mmol), methacrylic acid (2.67 g, 31.0 mmol), tert-butyl methacrylate (2.74 g, 19.25 mmol), mesitylene (80 mg, 0.67 mmol) and tetrahydrofuran (29 g) were added to a nitrogen purged reaction vessel equipped with a magnetic stir bar and condenser. The reaction vessel was then sparged with nitrogen at room temperature (approximately 23° C.) for one hour. The reaction was then heated to 60° C. Initiator (0.297 g, in 2 g THF, VAZO 67) was added to the reaction flask using a syringe. The temperature of the reaction mixture was held at 68° C. for 20 hours. The reaction mixture was then cooled to room temperature (23° C.) and was analyzed to be a fluorinated methacrylate/methacrylic acid/t-butyl methacrylate copolymer.

The fluorinated methacrylate/methacrylic acid/t-butyl methacrylate copolymer was heated to 45° C. and ammonium hydroxide (14.6 M, 1.88 g in 58 g water) was added. The reaction mixture was stirred under a nitrogen blanket for one hour at 45° C. The mixture was concentrated in vacuo to remove residual THF and resulted in a 21.9 weight % solids dispersion in water. It was further diluted with water to 2 wt % solids tested and according to the methods described above.

Comparative Example A

Perfluoroalkyl acrylate, having the formula $CF_3(CF_2)_7CH_2CH_2OC(O)CH=CH_2$ (10 g, 18.8 mmol), acrylic acid (5.83 g, 80.95 mmol), stearyl acrylate (0.833 g, 2.57 mmol), mesitylene (80 mg, 0.67 mmol) and tetrahydrofuran (27 g) were added to a nitrogen purged reaction vessel equipped with a magnetic stir bar and condenser. The reaction vessel was then sparged with nitrogen at room temperature (approximately 23° C.) for one hour. The reaction was then heated to 60° C. Initiator (0.17 g, in 2 mL THF, VAZO 52) was added to the reaction flask using a syringe. The temperature of the reaction mixture was held at 60° C. for 13 hours. The reaction mixture was then cooled to room temperature (23° C.) and was analyzed to be a fluorinated acrylate/acrylic acid/stearyl acrylate copolymer.

The fluorinated acrylate/acrylic acid/stearyl acrylate copolymer was heated to 45° C. and ammonium hydroxide (14.6 M, 1.7 g in 58 g water) was added. The reaction mixture was stirred under a nitrogen blanket for one hour at 45° C. The mixture was concentrated in vacuo to remove residual THF and resulted in a 19.0 weight % solids dispersion in water. It was further diluted with water to 2 wt % solids and tested according to the methods described above.

Comparative Example B

Perfluoroalkyl methacrylate, having the formula $CF_3(CF_2)_5CH_2CH_2OC(O)C(CH_3)=CH_2$ (14.6 g, 33.8 mmol), methacrylic acid (2.67 g, 31.0 mmol), n-butyl methacrylate (2.74 g, 19.25 mmol), mesitylene (80 mg, 0.67 mmol) and tetrahydrofuran (29 g) were added to a nitrogen purged reaction vessel equipped with a magnetic stir bar and condenser. The reaction vessel was then sparged with nitrogen at room temperature (approximately 23° C.) for one hour. The reaction was then heated to 60° C. Initiator (0.297 g, in 2 g THF, VAZO 67) was added to the reaction flask using a syringe. The temperature of the reaction mixture was held at 68° C. for 20 hours. The reaction mixture was then cooled to room temperature (23° C.) and was analyzed to be a fluorinated acrylate/acrylic acid/stearyl acrylate copolymer.

The fluorinated acrylate/acrylic acid/stearyl acrylate copolymer was heated to 45° C. and ammonium hydroxide (14.6 M, 1.88 g in 58 g water) was added. The reaction mixture was stirred under a nitrogen blanket for one hour at 45° C. The mixture was concentrated in vacuo to remove residual THF and resulted in a 21.9 weight % solids dispersion in water. It was further diluted with water to 2 wt % solids and tested according to the methods described above.

Comparative Example C

STONESPECIFIC Tumbled/Honed Marble, Travertine, Limestone+Slate Sealer (commercially available from Custom Building Products, Seal Beach, Calif.) was applied as directed by the manufacturer and tested according to the methods described above.

Examples 1 and 2 and Comparative Examples A, B, and C were applied to white marble (Table 4), black marble (Table 5) and limestone (Table 6) as described above and tested according to Test Method 2, 24 Hour Etch Test. The test liquids were orange juice and pickle brine.

TABLE 4

Time to Maximum Etch on Polished White Marble

| | Orange Juice | | Pickle Brine | |
|---|---|---|---|---|
| Example | Score | Time | Score | Time |
| Control | 2 | 5 min | 2 | 5 min |
| Example 1 | 0 | 24 h | 0 | 24 h |
| Example 2 | 0 | 24 h | 0 | 24 h |
| Comparative Example A | 2 | 20 min | 2 | 10 min |
| Comparative Example B | 1 | 60 min | 1 | 5 min |
| Comparative Example C | 3 | 5 min | 3 | 5 min |

TABLE 5

Time to Maximum Etch on Polished Black Marble

| | Orange Juice | | Pickle Brine | |
|---|---|---|---|---|
| Example | Score | Time | Score | Time |
| Control | 2 | 5 min | 2 | 5 min |
| Example 1 | 0 | 24 h | 1 | 20 min |
| Example 2 | 0 | 24 h | 0 | 24 h |
| Comparative Example A | 2 | 10 min | 2 | 20 min |
| Comparative Example B | 2 | 20 min | 2 | 30 min |
| Comparative Example C | 3 | 5 min | 3 | 5 min |

TABLE 6

Time to Maximum Etch on Limestone

| | Orange Juice | | Pickle Brine | |
|---|---|---|---|---|
| Example | Score | Time | Score | Time |
| Control | 1 | 5 min | 1 | 5 min |
| Example 1 | 0 | 24 h | 1 | 20 min |
| Example 2 | 0 | 24 h | 0 | 24 h |
| Comparative Example A | 1 | 5 min | 1 | 5 min |
| Comparative Example B | 1 | 10 min | 1 | 5 min |
| Comparative Example C | 1 | 10 min | 1 | 10 min |

The maximum etch recorded is indicated for a given time for each substrate tested. For white marble, both Examples 1 and 2 showed no etching after 24 hours for both orange juice and pickle brine. For black marble and limestone, Example 2 showed no etching after 24 hours for both liquids tested. For black marble and limestone, Example 1, showed no etching for orange juice after 24 hours. For black marble and limestone, Example 1 showed minor etching (rating of 1) after 20 minutes for pickle brine. Conversely, Comparative Examples A, B, and C showed minor to severe etching on all substrates tested. Comparative Example A, which is a repeat of a composition exemplified in Ueda et al., in U.S. Patent Application 2007-0197717 incorporating long chain alkyl(meth)acrylate (i.e., stearyl acrylate). Comparative Example A showed an etch rating of 2 for white and black marble after 10 to 20 minutes. For limestone, Comparative Example A showed minor etching after only five minutes for both liquids tested. For Comparative Example B, a repeat of Example 2, with linear n-butyl acrylate in place of tert-butyl acrylate. Comparative Example B showed moderate etching on white and black marble after 10 to 20 minutes minor etching after 5 to 10 minutes on limestone for both liquids. Comparative Example C is a commercially available stone protectant. Comparative Example C showed severe etching on white and black marble after 5 minutes and minor etching on limestone after 10 minutes for both liquids.

Examples 1 and 2 and Comparative Examples A, B, and C were applied to white marble, black marble, and limestone as described above and tested according to Test Method 2, 24 Hour Etch Test. The test liquid vinegar.

TABLE 7

Vinegar Etching Times

| | Substrate | | | | | |
|---|---|---|---|---|---|---|
| | Polished White Marble | | Polished Black Marble | | Limestone | |
| Example | Score | Time | Score | Time | Score | Time |
| Control | 3 | 5 min | 3 | 5 min | 3 | 5 min |
| Example 1 | 3 | 60 min | 3 | 20 min | 3 | 30 min |
| Example 2 | 3 | 60 min | 3 | 45 min | 3 | 20 min |
| Comparative Example A | 3 | 20 min | 3 | 10 min | 3 | 10 min |
| Comparative Example B | 3 | 45 min | 3 | 10 min | 3 | 20 min |
| Comparative Example C | 3 | 5 min | 3 | 5 min | 3 | 10 min |

Vinegar is known to be an aggressive etchant on calcium carbonate containing substrates resulting in a severe rating. The present invention provides a method that slows the aggressive etching vinegar liquid. Table 7 illustrates the increased times the present invention provides for substrates treated with copolymers of Formula I. Un-treated substrates showed a severe rating as soon as 5 minutes for each substrate. For polished white marble, Examples 1 and 2 provided 60 minutes before vinegar severely etched the surface, compared to 20, 45, and 5 minutes for Comparative Examples A, B, C, respectively. For polished black marble, Examples 1 and 2 provided 20 and 45 minutes, respectively, before vinegar severely etched the surface, compared to 10, 10, and 5 minutes for Comparative Examples A, B, C, respectively. For limestone, Examples 1 and 2 provided 30 and 20 minute, respectively, before vinegar severely etched the surface, compared to 10, 20, and 10 minutes for Comparative Examples A, B, C, respectively. The present invention provides at least double the time before severe etching occurs.

Example 3

Perfluoroalkyl methacrylate, having the formula $CF_3(CF_2)_5CH_2CH_2OC(O)C(CH_3)=CH_2$ (43.7 g, 101.4 mmol), methacrylic acid (8.01 g, 93.0 mmol), tert-butyl methacrylate (8.22 g, 57.75 mmol), mesitylene (240 mg, 2.01 mmol), MIBK (27 g) and isopropanol (60 g) were added to a nitrogen purged reaction vessel equipped with a magnetic stir bar and condenser. The reaction vessel was then sparged with nitrogen at room temperature (approximately 23° C.) for one hour. The reaction was then heated to 60° C. Initiator (0.891 g, in 2 mL isopropanol, VAZO 67) was added to the reaction flask using a syringe. The temperature of the reaction mixture was held at 68° C. for 20 hours. The reaction mixture was then cooled to room temperature (23° C.) and was analyzed to be a fluorinated methacrylate/methacrylic acid/t-butyl methacrylate copolymer.

The fluorinated methacrylate/methacrylic acid/t-butyl methacrylate copolymer was heated to 45° C. and ammonium hydroxide (14.6 M, 5.64 g in 174 g water) was added. The reaction mixture was stirred under a nitrogen blanket for one hour at 45° C. The mixture was concentrated in vacuo to remove residual THF and resulted in a 24.8 weight % solids dispersion in water. It was further diluted with water to 2 wt % solids and tested according to the methods described above.

Example 4

An polymer prepared according example 3, except the 24.8 weight % solids dispesion in water is diluted to 4 wt %. The resulting mixture was applied and tested according to the methods decribed above.

Example 4 was applied to limestone (Table 8) and white marble (Table 9) and tested against mineral acids (sulfuric acid and hydrochloric acid) for maximum etch and compared to untreated substrates.

TABLE 8

Mineral Acid Etching on Limestone

| | 1M H$_2$SO$_4$ | | 1M HCl | |
|---|---|---|---|---|
| Example | Score | Time | Score | Time |
| Control | 3 | 10 min | 3 | 10 min |
| Example 4 | 2 | 60 min | 0 | 60 min |

TABLE 9

Mineral Acid Etching on White Marble

| | 1M H$_2$SO$_4$ | | 1M HCl | |
|---|---|---|---|---|
| Example | Score | Time | Score | Time |
| Control | 3 | 5 min | 3 | 10 min |
| Example 4 | 2 | 60 min | 0 | 60 min |

Example 4 showed improved etch resistance compared to untreated limestone and white marble. Untreated substrates showed maximum etching in as little time as 5 to 10 minutes. Substrates treated with Example 4 only showed a etch rating of 2 after 60 minutes. For hydrochloric acid, untreated substrates showed maximum etch in 10 minutes. Substrates treated with Example 4 show no visible etching after 60 minutes.

Example 4 was applied to white marble and limestone substrates and cured according to the conditions in Table 10.

TABLE 10

Vinegar Etch on Limestone after Curing

| | | Substrate | | | |
|---|---|---|---|---|---|
| | Curing | Polished White Marble | | Limestone | |
| Example | Time/Temp. | Score | Time | Score | Time |
| Control | | 3 | 5 min | 3 | 5 min |
| Example 4 | 24 h/20° C. | 3 | 2 h | 3 | 2 h |
| Example 4 | 2 wk/20° C. | 2 | 6 h | * | * |
| Example 4 | 2 min/150° C. | 3 | 24 | 3 | 24 |

* = not tested

Table 10 shows the increased performance of co-polymers of the present invention when a curing process is used after applying Example 4 on polished white marble and limestone when exposed to vinegar. By allowing the co-polymer of Example 4 to cure at room temperature for 24 hours, increases the time to maximum etching to 2 hours for both substrates, compared to 5 minutes for untreated substrates. By allowing the co-polymers of Example 4 to cure for 14 days at room temperature (20° C.), 6 hours, the etch was improved to a moderate rating for white marble. For substrates that were cured at 150° C. for 2 minutes, the time to maximum etching was improved to 24 hours.

Examples 5 to 8 are formulations of Example 4 with commercially available tile sealers normally used to add gloss to tile surfaces. Comparative Examples D to G are the commercially available tile sealers.

Example 5

An aqueous dispersion is prepared according to Example 4 and and mixed with an equal volume of semi-gloss sealer (sodium dodecylbenzenesulfonate (5-10%), acrylic copolymer (10-35%), ethoxylated aklyl phosphate (5-10%) in water) (commercially available from E. I. du Pont de Nemours and Company, Wilmington, Del.) that was diluted to 4 wt % solids. The resulting mixture was applied and tested according to the methods described above.

Comparative Example D

The same semi-gloss sealer used in Example 5 was diluted to 4 wt % solids without copolymers of the present invention. The sealer was applied and tested according to the methods described above.

Example 6

An aqueous dispersion is prepared according to Example 4 and mixed with an equal volume of a high gloss sealer and finish (commercially available from Aqua Mix, Inc., Corona, Calif.). The resulting mixture was applied and tested according to the methods described above.

Comparative Example E

The same high gloss sealer and finish used in Example 6 was diluted to 4 wt % solids without copolymers of the present invention. The sealer was applied and tested according to the methods described above.

Example 7

An aqueous dispersion is prepared according to Example 4 and and mixed with an equal volume of sealer (Glaze and Seal WB Wet Look II Sealer, commercially available from Glaze 'N Seal, Irvine, Calif.). The resulting mixture was applied and tested according to the methods described above.

Comparative Example F

The same sealer used in Example 7 was diluted to 4 wt % solids without copolymers of the present invention. The sealer was applied and tested according to the methods described above.

Example 8

An aqueous dispersion is prepared according to Example 4 and and mixed with an equal volume of sealer (Gloss Wet Look Cure Sealer, commercially available from Homax Jasco Bix, Bellingham, Wash.). The resulting mixture was applied and tested according to the methods described above.

Comparative Example G

The same sealer used in Example 8 was diluted to 4 wt % solids without copolymers of the present invention. The resulting mixture was applied and tested according to the methods described above.

Coplymer of Example 4 and the copolymer/sealer formulations of Examples 5 to 8 and sealers of Comparative Examples D to G were applied to white marble and etched tested using vinegar.

TABLE 11

Etching of White Marble with Vinegar
Polished White Marble

| Example | Score | Time |
| --- | --- | --- |
| Control | 3 | 5 min |
| Example 4 | 2 | 45 min |
| Example 5 | 0 | 24 h |
| Comparative Example D | 0 | 24 h |
| Example 6 | 2 | 30 min |
| Comparative Example E | 2 | 30 min |
| Example 7 | 2 | 30 min |
| Comparative Example F | 3 | 30 min |
| Example 8 | 2 | 10 min |
| Comparative Example G | 3 | 20 min |

Adding sealers to the copolymers of the present invention adds to the etch resistance compared to untreated white marble substrates. In some cases, such as Example 7 and 8, the addition of the sealers help increase the acid etch resistance.

Copolymer of Example 4 and the copolymer/sealer formulations of Examples 5 to 8 and sealers of Comparative Examples D to G were applied to limestone and etched tested using vinegar. The treated substrates were also tested for oil and water repellency using Test Methods 3 and 4.

TABLE 12

Etch Resistance, Oil and Water Repellency on Limestone
Limestone

| Example | Oil | Water | Acid Etch Score | Time |
| --- | --- | --- | --- | --- |
| Control | 0 | 0 | 3 | 5 min |
| Example 4 | 8 | 12 | 3 | 24 hr |
| Example 5 | 7 | 9 | 0 | 24 hr |
| Comparative Example D | 7 | 8 | 1 | 24 hr |
| Example 6 | 8 | 8 | 0 | 24 hr |
| Comparative Example E | 7 | 3 | 1 | 20 min |
| Example 7 | 8 | 8 | 0 | 24 hr |
| Comparative Example F | 7 | 4 | 2 | 24 hr |
| Example 8 | 2 | 6 | 3 | 24 hr |
| Comparative Example G | 0 | 0 | 3 | 10 min |

Table 12 illustrates etch resistance and oil and water repellency using copolymers of the present invention and sealers. The untreated limestone substrate severely etched with vinegar in 5 minutes. For tiles treated with only copolymer of Example 4, etching with vinegar was extended to 24 hours and also had excellent oil and water repellency. When copolymers of Example 4 were mixed with semi-gloss and gloss sealers (Examples 5 to 7), the limestone still retained most, if not all, of the oil repellency properties and retained most of the water repellency. Surprisingly, for Examples 5 to 7, the vinegar etch resistance increased to visible etching after 24 hours compared to copolymers of Example 4 alone, and Comparative Examples D, E, and F (sealers alone). For Example 8, where the oil and water repellency was reduced from Example 4 and the etch resistance remained the same as Example 4. Compared to Comparative Example G, the sealer without a copolymer of Example 4, severe etching occurred within 10 minutes. It is clearly shown that by treating substrates with copolymers of the invention and sealers unexpectantly provide the maximum etch resistance while maintaining most of the oil and water repellency afforded to the copolymers alone.

It is surprisingly found that the use of short chain, branched (meth)acrylates in copolymers with fluoro(meth)acrylates and (meth)acrylic acid monomer neutralized with ammonium, provide acid etch resistance and oil and water repellency to calcareous substrates such as marble, limestone and travertine.

What is claimed is:

1. A method of providing acid etch resistance, water repellency, oil repellency and stain resistance to a substrate surface comprising contacting the substrate surface with a copolymer of formula (I)

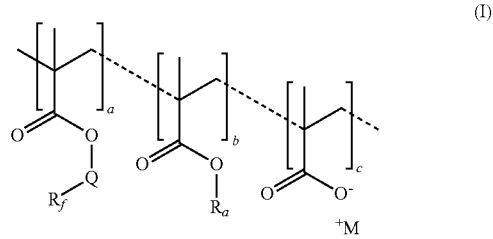

wherein
$R_f$ is $C_1$ to $C_{10}$ linear or branched fluoroalkyl, optionally interrupted by one or more —O—, —CH$_2$—, —CFH—, or combinations thereof;
Q is an alkylene of 1 to about 15 carbon atoms, hydroxyalkylene of 3 to about 15 carbon atoms, —(C$_n$H$_{2n}$)(OC$_q$H$_{2q}$)$_m$—, —(C$_n$H$_{2n}$)(NR')$_z$—SO$_2$—NR'(C$_n$H$_{2n}$)—, or —CONR'(C$_n$H$_{2n}$)—, wherein each R' is independently H or an alkyl of from 1 to about 4 carbon atoms, n is independently 1 to about 15, q is 2 to about 4, m is 1 to about 15, and z is 0 or 1;
$R_a$ is a $C_3$ to $C_4$ branched alkyl;
M is H, NH$_4$, Na, Li, Cs, K, HNR$_3$ or mixtures thereof;
R is $C_1$ to $C_4$ linear or branched alkyl;
a is an integer from about 20 to about 50 mol %;
b is an integer from about 5 to about 35 mol %; and
c is an integer from about 15 to about 60 mol %;
wherein the sum of a+b+c is equal to 100%.

2. A method of claim 1, wherein the copolymer of Formula I is in the form of a dispersion.

3. A method of claim 2, wherein the dispersion further comprises at least one surfactant.

4. A method of claim 2, wherein the dispersion further comprises at least one sealer.

5. A method of claim 2, wherein the dispersion further comprises at least one surfactant and at least one sealer.

6. A method of claim 1 further comprising curing the copolymer of Formula I on the substrate.

7. A method of claim 6, wherein the curing occurs from about 20° C. to from about 150° C. for a time from about 2 minutes to about 14 days.

8. A method of claim 7, wherein the curing occurs at about 20° C. for about 14 days.

9. A method of claim 7, wherein the curing occurs at about 150° C. for about 2 minutes.

10. A method of claim 1, wherein $R_f$ is $C_4$ to $C_6$ fluoroalkyl and Q is —CH$_2$CH$_2$—.

11. A method of claim 1, wherein $R_a$ is isopropyl(meth)acrylate.

12. A method of claim 1, wherein $R_a$ is tert-butyl(meth)acrylate.

13. A method of claim 1, wherein M is NH$_4$.

14. A method of claim 1 wherein the contacting is by brushing, spraying, rollering, dipping, padding, doctor blade, wipe, dip techniques, or wet-on-wet procedure.

15. A method of claim 1 wherein the substrate contains calcium.

16. A method of claim 15 wherein the substrate is white marble, black marble, limestone, or travertine.

17. A substrate treated with a method of claim 1, which is white marble, black marble, limestone, or travertine.

18. A substrate treated with a method of claim 2.

19. A substrate treated with a method of claim 3.

20. A substrate treated with a method of claim 4.

* * * * *